United States Patent [19]

Zorzolo

[11] Patent Number: 5,341,074
[45] Date of Patent: Aug. 23, 1994

[54] OPERATION APPARATUS FOR A SEWING MACHINE

[75] Inventor: Alessandro Zorzolo, Vigevano-Pavia, Italy

[73] Assignee: Comelz S.p.A., Vigevano-Pavia, Italy

[21] Appl. No.: 854,808

[22] Filed: Mar. 19, 1992

[51] Int. Cl.⁵ ............................................. D05B 69/12
[52] U.S. Cl. ..................................... 318/17; 318/254; 318/558; 310/68 R; 112/220
[58] Field of Search ........................ 318/558, 254, 17; 310/66, 67 R, 68 B, 68 R, 89, 227; 112/275, 277, 300, 220

[56] References Cited
U.S. PATENT DOCUMENTS 3,789,783  2/1974  Cook et al. ............................ 112/220
4,668,898  5/1987  Harms et al. ......................... 318/254
4,749,923  6/1988  Chieng ................................. 318/269
4,988,905  1/1991  Tolmie, Jr. ......................... 310/68 B
5,018,466  5/1991  Hasegawa ............................ 112/275

*Primary Examiner*—Bentsu Ro
*Attorney, Agent, or Firm*—Nims, Howes, Collison, Hansen & Lackert

[57] ABSTRACT

An operation apparatus for a sewing machine has an electric motor for driving the sewing machine and electronic components for operating and controlling the electric motor and sewing machine; the electric motor and electronic components are accommodated within a common, heat-conductive box-type body effective to dissipate the heat generated inside the body by the electric motor and the electronic components to the outside.

28 Claims, 4 Drawing Sheets

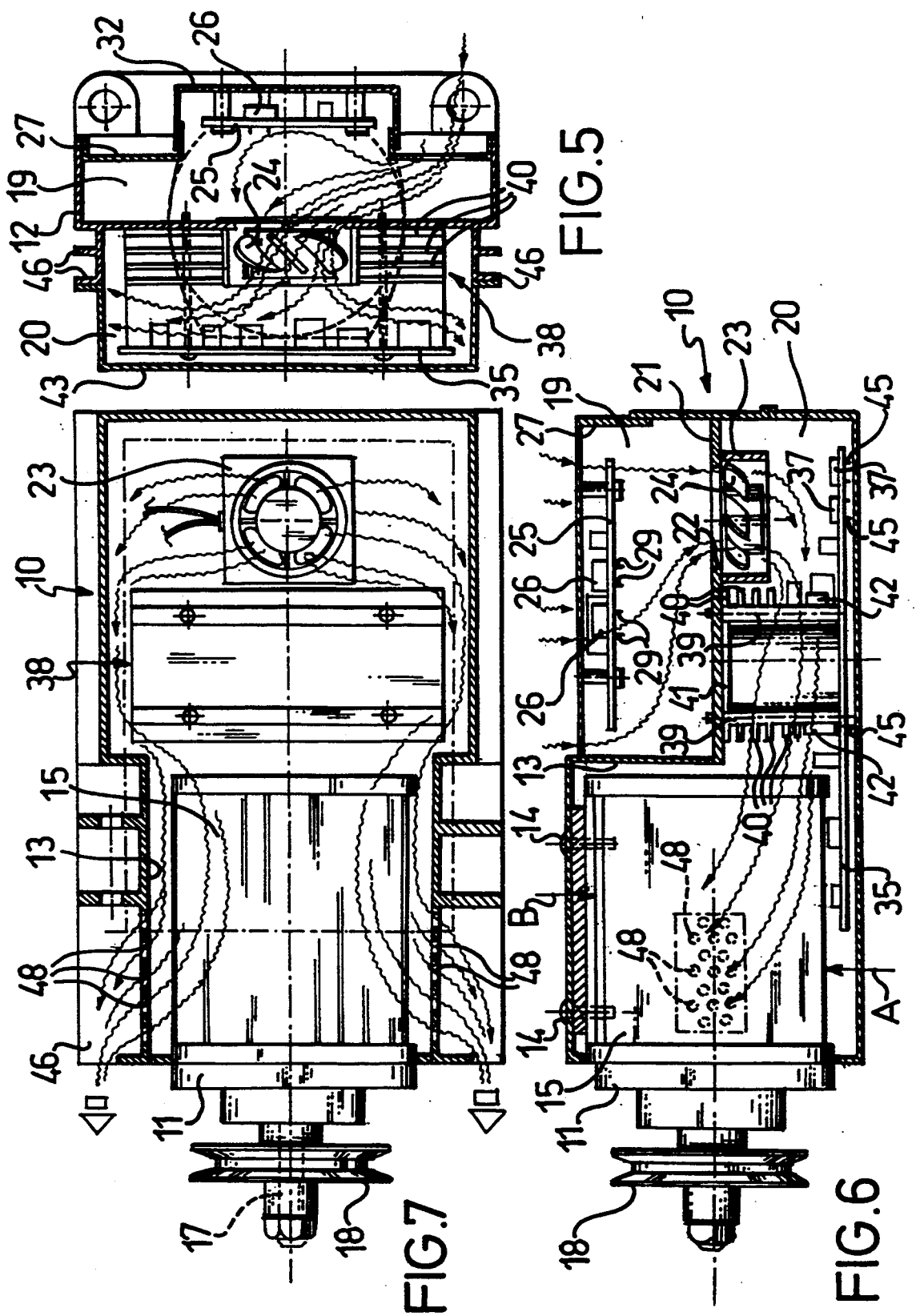

OPERATION APPARATUS FOR A SEWING MACHINE

TECHNICAL FIELD

This invention relates to a sewing machine operation apparatus comprising an electric motor for actuating the sewing machine movements and electronic means for operating and controlling the electric motor and sewing machine.

BACKGROUND OF THE INVENTION

The electric motor drives the sewing needle and all such interlockingly driven members as the transport, crochet, needle carrier bar, etc.

The electronic means comprise microprocessors connected, through power transistors, to the electric motor and a number of electrically operated devices within the sewing machine. The microprocessors are suitably programmed to ensure that all the various sewing machine functions are performed correctly by operating and controlling the electric motor and said electrically operated devices.

It has been prior art practice to accommodate such electronic means within a case mounted on one side to the electric motor. The assembly comprised of the case enclosing the electronic means and the electric motor was disposed beneath the work top of a desk mounting the sewing machine.

A serious drawback of such an operation assembly is that the electric motor and power transistors would become overheated under severe operating conditions of the sewing machine. This overheat situation may result in malfunction or even total failure of the electric motor and the power transistors, besides causing discomfort to the operator whose legs would be normally kept close to the operation assembly.

Another drawback comes from the physical size of said operation assembly, which occupies a relatively large proportion of the space available underneath the work top to restrict legroom for the operator. In addition, its size poses some difficulty to the installation of the operation assembly under the machine work top.

SUMMARY OF THE INVENTION

It is an object of this invention to obviate the above-noted drawbacks.

This object is achieved by a sewing machine operation apparatus comprising an electric motor for actuating the sewing machine movements and electronic means for operating and controlling the electric motor and sewing machine, characterized in that the electric motor and electronic means are accommodated within a common, heat-conductive box-type body effective to dissipate heat generated inside said body by the electric motor and the electronic means to the outside.

For a better understanding of this invention features and advantages, a detailed description of an exemplary and non-limitative embodiment thereof will be given further herein with reference to the accompanying drawings.

BRIEF DESCRIPTION OF THE DRAWING

FIG. 5 is a cross-sectional view of the apparatus shown in FIG. 1;

FIG. 6 is a longitudinal section plan view of the apparatus shown in FIG. 1; and FIG. 7 is a longitudinal section side view of the apparatus shown in FIG. 1.

DETAILED DESCRIPTION OF THE PREFERRED EMBODIMENTS

Figure 1:
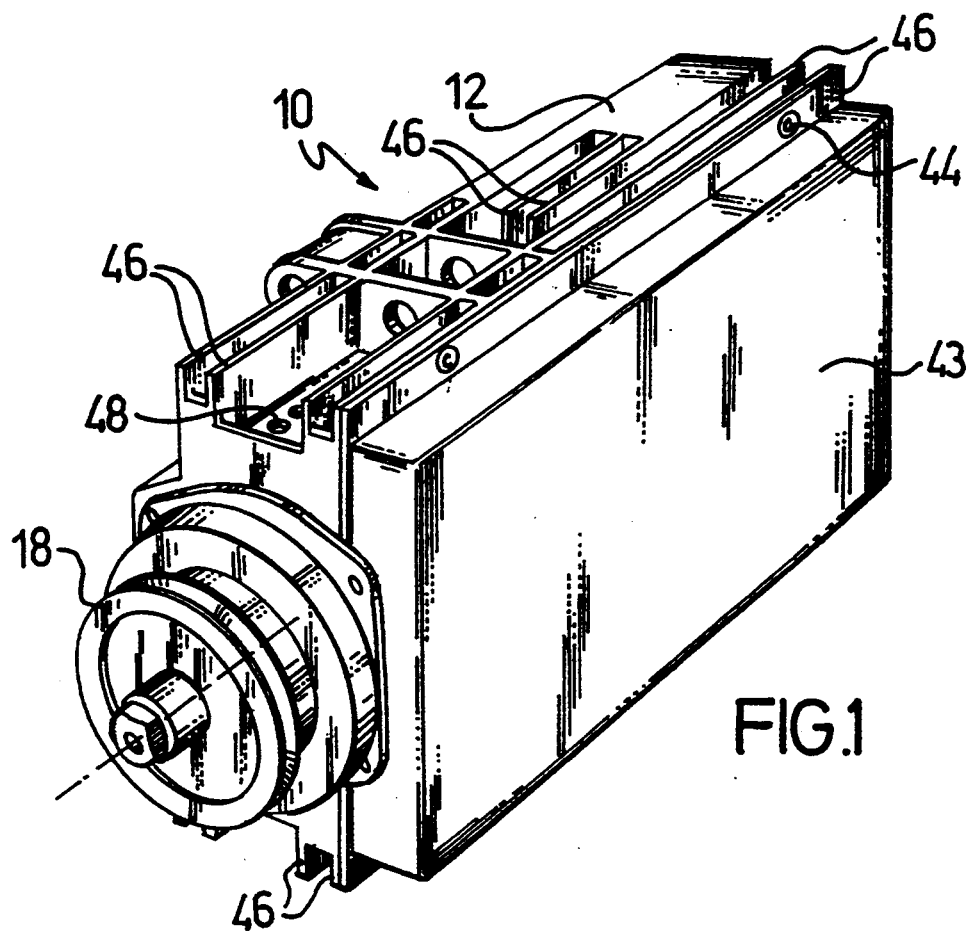
FIG. 1 shows in perspective the right-hand front of a sewing machine operation apparatus according to the invention.
Figure 2:
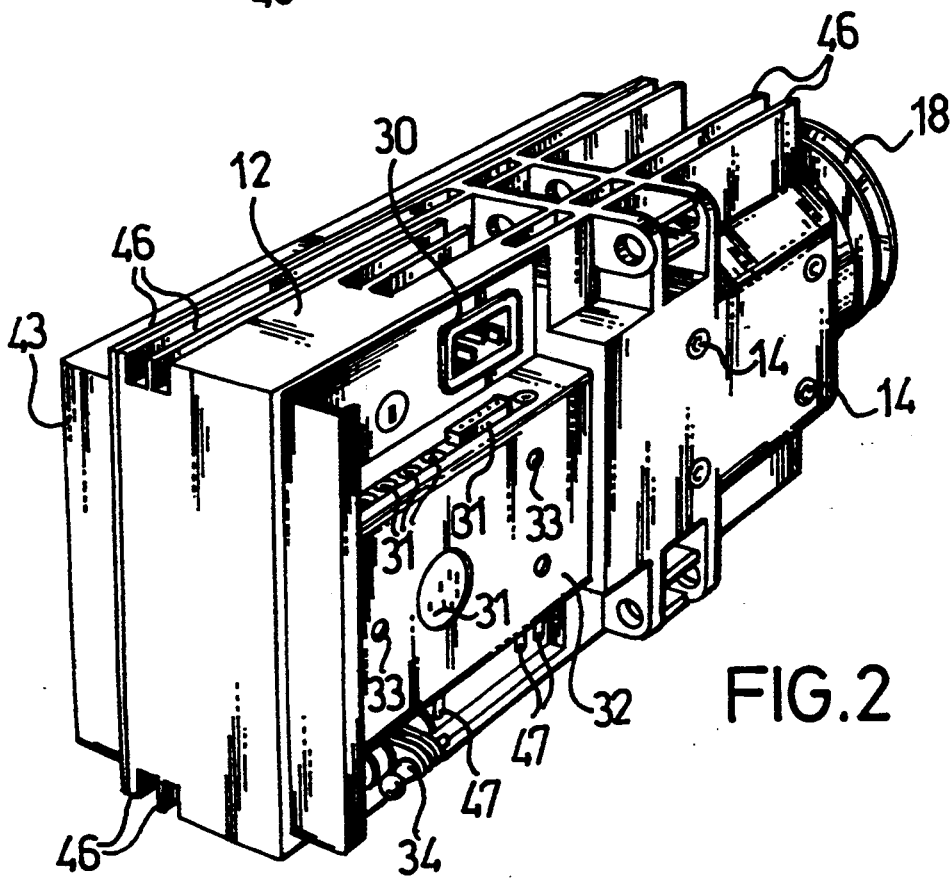
FIG. 2 shows in perspective the left-hand rear of the apparatus in FIG. 1.
Figure 3:
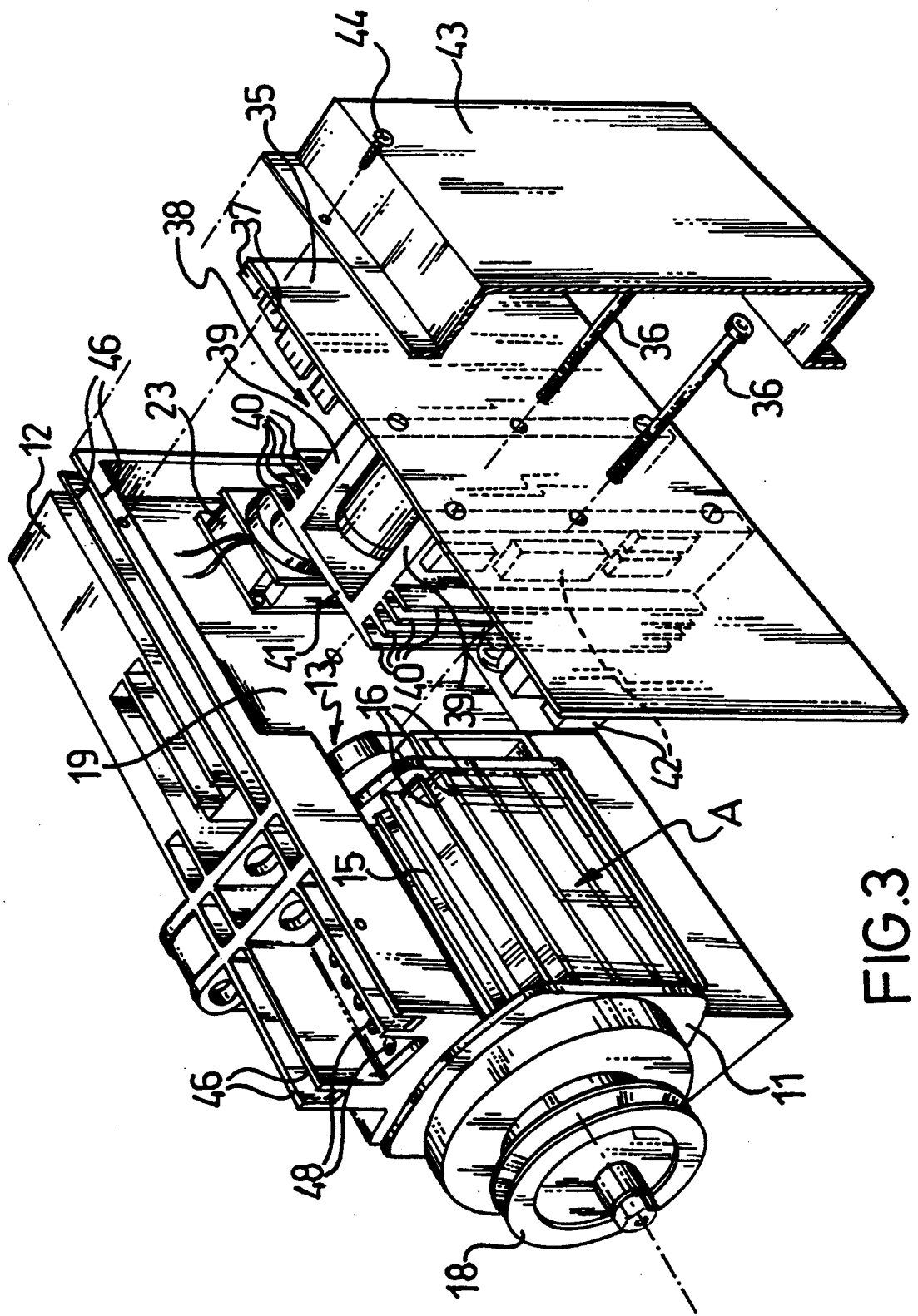
FIG. 3 is an exploded view of what is shown in FIG. 1.
Figure 4:
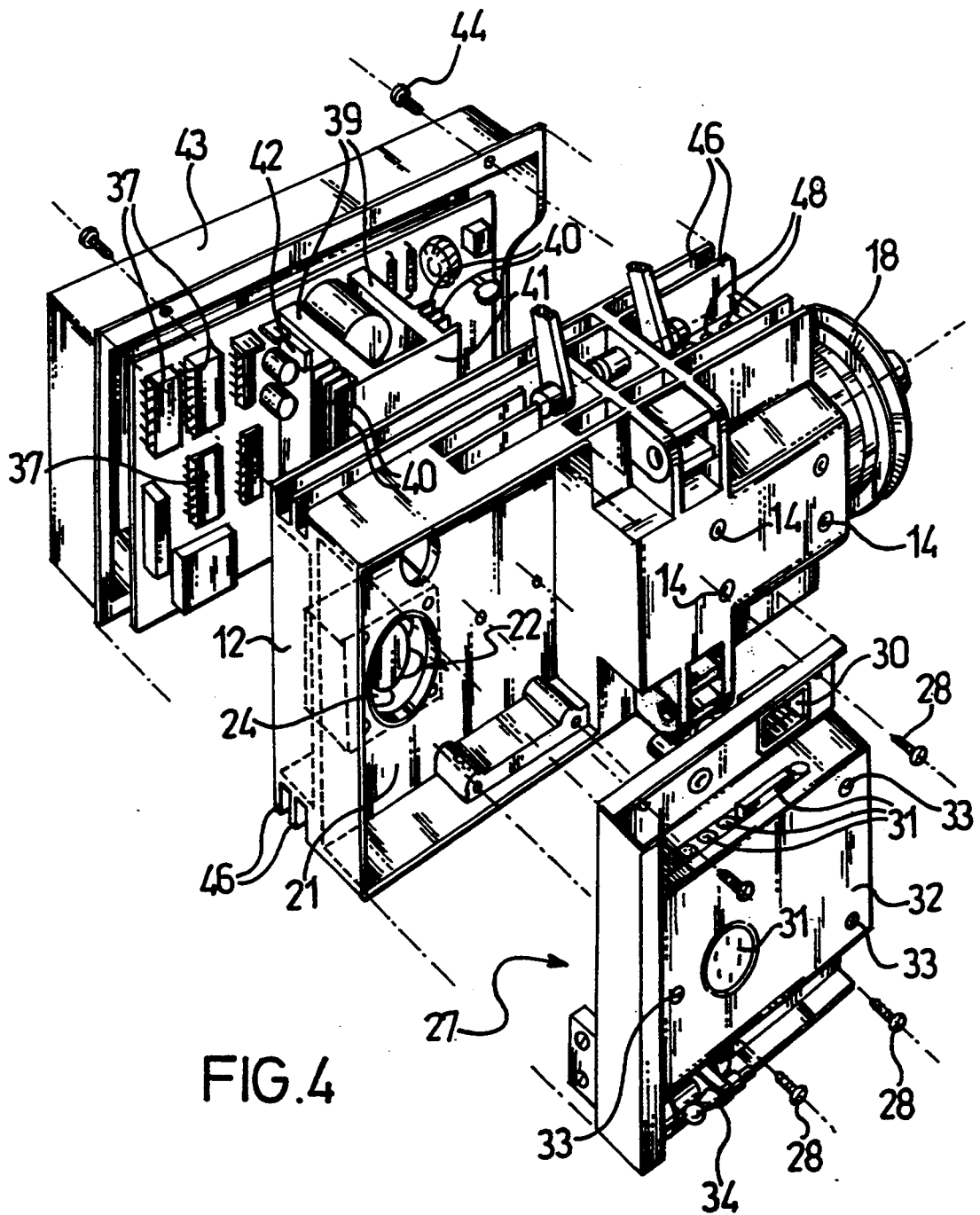
FIG. 4 is an exploded view of what is shown in FIG. 2.

The apparatus of FIG. 1, which is intended to permit operation of an industrial sewing machine, comprises a box-type body 10 which encloses an electric motor 11 (FIG. 3) and electronic means for operating and controlling the electric motor 11 and sewing machine, not shown.

The box-type body 10, which is formed from a heat-conductive material such as aluminum, comprises (FIG. 3) a central base structure 12 having a seat 13 which accommodates the electric motor 11 held securely therein by screws 14 (FIG. 6).

The electric motor 11 has a finned case 15 including cooling fins 16 and two opposed flat faces A, B (FIG. 6) of which one, face B, is in contact with one wall of the seat 13.

The shaft 17 of the electric motor 11 protrudes from the body 10 such that an outward pulley 18 can be attached thereto; a drive belt, not shown, would be trained around the pulley 18 to transmit motion from the electric motor 11 to the sewing machine.

Also formed in the box-type body 10 are two chambers 19 and 20 (FIG. 5) which are separated by a partition 21.

The partition 21 is apertured as at 22 to accommodate a fan 23 to be mounted to the wall 21. The fan 23 has an electric motor of its own driving an impeller 24 effective to draw air from the chamber 19 and force it into the chamber 20.

The chamber 19 accommodates a board 25 bearing power transistors 26 and other electronic components (FIGS. 5, 6); further, conductive traces are formed on the board 25 to interconnect such electronic components. The board 25 is made unitary with the interior of a cover 27 which is fastened to structure 12 by means of screws 28 and confines and closes the chamber 19. The electronic components (including the power transistors 26) are disposed on the board 25 side facing the cover 27, whereas the terminals 29 for such electronic components are disposed on the opposed side. The cover 27 mounts an electric socket 30 for connecting the apparatus shown to the mains, and additional sockets 31 for connecting the apparatus shown to different control and actuation devices of the sewing machine; specifically, the board 25 and sockets 31 are mounted on a detachable front panel 32 of the cover 27 which is fastened to the remainder of the cover 27 by means of screws 33. The cover 27 also bears a mechanism, not described herein and not shown, which is adapted for connection, through a lever 34, to a pedal control for transmitting the operator's commands to the apparatus shown.

Received on the opposite side within the chamber 20 is another board 35, fastened to the bearing structure 12 by means of screws 36. The board 35 mounts microprocessors 37 and other electronic components. Also mounted on the board 35 is a U-shaped heat sink 38 having side walls 39 from which cooling fins 40 extend and a base wall 41 in contact with the partition 21. Affixed to the side walls 39 are power transistors 42. The board 35 is also formed with conductive traces interconnecting these electronic components (microprocessors 37, power transistors 42, and the other electronic components).

The board 35 is protected under a cover 43 attached to the central structure 12 by screws 44 and adapted to confine and close the chamber 20. The electronic components (including the microprocessors 37) mounted on the board 35 and the power transistors 42 mounted on the heat sinker 38 are laid to face the partition 21, whereas their terminals 45 are arranged on the board 35 side facing toward the cover 43.

For interconnecting the various electrical and electronic parts of the apparatus just described, there are provided a number of connectors inside the box-type body 10, not described herein.

The central structure 12 of the box-type body 10 is provided with cooling fins 46 laid lengthwise across its exterior.

The cover 27 is apertured with windows 47 for admitting air into the chamber 19. The seat 13 is formed, at the top and bottom, with through-going holes 48 for exhausting the air from said seat.

The electric motor 11 drives the sewing needle and all the members drivingly connected to it through the drive pulley 18.

The microprocessors 37 are connected, via power transistors 42, to the electric motor 11, and via power transistors 26, to various electrically operated devices of the sewing machine. The microprocessors 37 are suitably programmed to ensure proper performance of all the different sewing machine functions selected by the operator, by operating and controlling the electric motor 11 and the aforesaid electrically operated devices.

Under severe operating conditions of the sewing machine, heat generated inside the box-type body 10 by the electric motor 11 and the power transistors 26 and 42 will be effectively dissipated by the box-type body 10 itself, as by conduction; convection, and radiation. This is afforded by the heat-conductive nature of the box-type body 10 and its ample outer surface area of heat exchange with the ambient air resulting from both the electric motor 11 and the various electronic components having been enclosed in a common case.

Dissipation of the heat generated by the electric motor 11 is also promoted by that the case 15 of the motor 11 is in contact with the wall of the seat 13 in the box-type body 10, whereto it is affixed, thereby the conduction of heat between the motor case 15 and the box-type body 10 is enhanced.

Dissipation of the heat generated by the power transistors 42, which are more prone on overheating than the other power transistors 26, is promoted by that they are in contact with the heat sink 38 and that the heat sink 38 is in contact with the partition 21 of the box-type body 10, thereby a high heat transfer rate is established from the power transistors 42 toward the box-type body 10.

Understandably, the fins 16 of the electric motor 11, fins 40 of the heat sink 38, and fins 46 of the central structure 12 will contribute additionally toward dissipating the heat.

The forced ventilation action from the fan 23 should also be taken into account, which causes a flow of cooling air through the interior of the box-type body 10. In particular, and as shown by arrow marks in FIGS. 5, 6 and 7, outside air is drawn in by the fan 23 through the windows 47 and directed into the chamber 19 wherein it will sweep across the board 25 and cool the power transistors 26; the air is then directed to the fan 23 in the chamber 20 wherein it will sweep across the heat sink 38 to cool it; lastly, the air is caused to flow into the seat 13 wherein it sweeps across the case 15 of the electric motor 11 and cools it, to exhaust through the upper and lower holes 48.

The fan 23 is provided independent, thereby it can cool the interior of the box-type body 10 continuously, irrespective of whether the electric motor 11 is in operation or stopped.

In addition, the apparatus herein described and illustrated is quite compact, it having a single body which encloses both the electric motor 11 and all the electronic components, such that it will take little space, in contrast with the prior art operation assemblies mentioned in the preamble.

The flat faces A, B of the case 15 of the electric motor 11 are contributive toward making the electric motor itself, and hence the apparatus as a whole, quite compact. Furthermore, the detachability of the electric motor 11, as due to it being secured in the seat 13 by screw fasteners 14, and its flat-faced design, allow the electric motor 11 to be removed from its seat 13 where required to fit it inside the sewing machine using one of its flat faces A, B as a rest base.

By having the terminals 29 for the electronic components carried on the board 25 located on the opposed side from the side facing toward the cover 27, one can gain direct access to said terminals 29, after removing the cover, for inspection purposes, such as on the occurrence of failures to said electronic components, without being obliged to remove the board 25 from the cover 27.

Likewise, by having the terminals 45 for the electronic components carried on the board 35 and the heat sink 38 located on the board 35 side facing toward the cover 43, direct access can be again had to such terminals 45 for inspection, without being forced to remove the board 35 from the central structure 12.

The detachable feature of the front panel 32 of the cover 27, bearing the board 25 and socket 31, enables replacement of that front panel 32 with another front panel having different sockets and electronic components on the board suited to the type of the sewing machine to which the operation apparatus shown is to be connected.

Modifications may be made, of course, to the configurations and layout of the apparatus members as herein described and illustrated.

The electric drive motor for the sewing machine may have several of its case faces placed in contact with the walls of its seat in the box-type body. In addition, the motor case may be provided with just one flat face or more than two flat faces.

The heat sink within the box-type body on which the power transistors are mounted may contact more than one wall of the box-type body.

The cooling fan could be driven by the same electric motor which drives the sewing machine, although a separate fan is bound to be more effective because it provides forced ventilation even with said electric drive motor inoperative.

I claim:

1. A sewing machine operation apparatus comprising an electric motor for actuating the sewing machine movements and electronic means for operating and controlling the electric motor and sewing machine, characterized in that the electric motor and electronic means are accommodated within a common, heat-conductive box-type body effective to dissipate heat generated inside said body by the electric motor and the electronic means to the outside, and wherein the box-type body accommodates a cooling fan operative to generate an airflow sweeping across the electric motor and the electronic means, and wherein the cooling fan is powered independently.

2. An apparatus according to claim 1, wherein the box-type body is formed with apertures for admitting outside air as drawn in by the fan and further apertures for exhausting the air which swept across the electric motor and the electronic means.

3. An apparatus according to claim 1, wherein the electric motor is detachably secured in a seat on the box-type body, at least one face of the electric motor being in contact with a wall of said seat.

4. An apparatus according to claim 3, wherein at least one of the faces of the electric motor is flat.

5. An apparatus according to claim 3, wherein the electric motor is provided with cooling fins.

6. An apparatus according to claim 1, wherein the electronic means comprise power transistors mounted to a heat sink located inside the box-type body in contact relationship with at least one inner wall of the box-type body.

7. An apparatus according to claim 1, wherein said box-type body is provided with cooling fins.

8. A sewing machine operation apparatus comprising an electric motor for actuating the sewing machine movements and electronic means for operating and controlling the electric motor and sewing machine, characterized in that the electric motor and electronic means are accommodated within a common, heat-conductive box-type body effective to dissipate heat generated inside said body by the electric motor and the electronic means to the outside, and wherein said electronic means comprise power transistors mounted on a first board made unitary with a first cover detachably secured on a base structure of the box-type body.

9. An apparatus according to claim 8, wherein the power transistors mounted on said board are disposed on a board side facing toward the cover and have contact terminal portions disposed on the opposed side.

10. An apparatus according to claim 8, wherein said cover comprises a removable front panel bearing said board and electric sockets for external connection of the apparatus.

11. An apparatus according to claim 8, wherein said electronic means comprise microprocessors mounted on a second board made unitary with said base structure, affixed to said second board there being a heat sink bearing further power transistors which are connected to the electric motor, said heat sink being disposed within the box-type body in contact with at least one inner wall of the box-type body, said second board being closed with a second cover releasably secured on said base structure.

12. An apparatus according to claim 11, wherein the microprocessors mounted on said second board and said heat sink have terminal portions disposed on one side of said second board facing toward said second cover.

13. An apparatus according to claim 11, wherein the electric motor is accommodated in a respective seat on the box-type body, said first board and said second board are accommodated in two respective chambers formed separately in the box-type body, a stream of cooling air being forcibly flown through said chambers and said seat.

14. An apparatus according to claim 11 wherein said heat sink is provided with cooling fins.

15. An apparatus according to claim 8, wherein said heat sink is provided with cooling fins.

16. A sewing machine operation apparatus comprising an electric motor for actuating the sewing machine movements and electronic means for operating and controlling the electric motor and sewing machine, characterized in that the electric motor and electronic means are accommodated within a common, heat-conductive box-type body effective to dissipate heat generated inside said body by the electric motor and the electronic means to the outside, and wherein the box-type body accommodates a cooling fan operative to generate an airflow sweeping across the electric motor and the electronic means, and wherein said electronic means comprise power transistors mounted on a first board made unitary with a first cover detachably secured on a base structure of the box-type body.

17. An apparatus according to claim 16 wherein the power transistor mounted on said board are disposed on a board side facing toward the cover and have terminal portions disposed on the opposite side.

18. An apparatus according to claim 16, wherein said cover comprises a removable front panel bearing said board and electric sockets for external connection of the apparatus.

19. An apparatus according to claim 16, wherein said electronic means comprise microprocessors mounted on a second board made unitary with said base structure, affixed to said second board there being a heat sink bearing further power transistors which are connected to the electric motor, said heat sink being disposed within the box-type body in contact with at least one inner wall of the box-type body, said second board being closed with a second cover releasably secured on said base structure.

20. An apparatus according to claim 19, wherein the microprocessors mounted on said second board and said heat sink have terminal portions disposed on one side of said second board facing toward said second cover.

21. An apparatus according to claim 19, wherein the electric motor is accommodated in a respective seat on the box-type body, said first board and said second board are accommodated in two respective chambers formed separately in the box-type body, a stream of cooling air being forcibly flown through said chambers and said seat.

22. An apparatus according to claim 19, wherein said heat sink is provided with cooling fins.

23. A sewing machine operation apparatus comprising an electric motor for actuating the sewing machine movements and electronic means for operating and controlling the electric motor and sewing machine, characterized in that the electric motor and electronic means are accommodated within a common, heat-conductive box-type body effective to dissipate heat generated inside said body by the electric motor and the electronic means to the outside, and wherein the box-type body accommodates a cooling fan operative to generate an airflow sweeping across the electric motor and the electronic means, and wherein the box-type body is formed with apertures for admitting outside air as drawn in by the fan and further apertures for exhausting the air which swept across the electric motor and the electronic means, and wherein the cooling fan is powered independently.

24. An apparatus according to claim 23, wherein the electric motor is detachably secured in a seat on the box-type body, at least one face of the electric motor case being in contact with a wall of said seat.

25. An apparatus according to claim 24, wherein at least one of the faces of the electric motor case is flat.

26. An apparatus according to claim 25, wherein the electric motor is provided with cooling fins.

27. An apparatus according to claim 23, wherein the electronic means comprise power transistors mounted to a heat sink located inside the box-type body in contact relationship with at least one inner wall of the box-type body.

28. An apparatus according to claim 27, wherein said heat sink is provided with cooling fins.

* * * * *

UNITED STATES PATENT AND TRADEMARK OFFICE
CERTIFICATE OF CORRECTION

PATENT NO. : 5,341,074
DATED : August 23, 1994
INVENTOR(S) : Alessandro Zorzolo

It is certified that error appears in the above-identified patent and that said Letters Patent is hereby corrected as shown below:

On the title page item,
-- [30]   Foreign Application Priority Data

March 29, 1991        European    ........ 91830129.2 --

Signed and Sealed this

Third Day of October, 1995

Attest:

BRUCE LEHMAN

*Attesting Officer*    *Commissioner of Patents and Trademarks*